April 1, 1941. E. KÄSEMANN 2,236,972
POLARIZING BODY
Filed July 17, 1937

INVENTOR:
Erwin KAESEMANN
his Attorney.

Patented Apr. 1, 1941

2,236,972

UNITED STATES PATENT OFFICE 2,236,972

POLARIZING BODY

Erwin Käsemann, Klein-Machnow, near Berlin, Germany

Application July 17, 1937, Serial No. 154,204
In Germany March 22, 1937

4 Claims. (Cl. 88—65)

This invention relates to polarizing bodies which can be used for a variety of purposes such as manufacture of polarizing spectacles for viewing stereoscopic films, of devices for avoiding glare from automobile head lights, etc.

It is known to form light polarizing bodies by embedding crystallized dichroic substances such as herapathite (described as sulfate of iodoquinine or periodide of quinine sulfate, respectively) in colloids such as nitrocellulose, and causing orientation of the individual crystals so that their longitudinal axes are aligned in substantial parallelism, said orientation being effected by mechanical means such as rolling, stretching, drawing, etc. Such polarizing bodies, as an optical system, are not completely pure and not as transparent as, for example, other known polarizing bodies comprising single crystals of organic compounds. The last named polarizing bodies, however, are comparatively expensive.

It is an object of the present invention to form polarizing bodies which, as an optical system, are completely pure and transparent. Another object of the invention is to provide a cheap method of producing such polarizing bodies so that they can be widely used in cinematography, for eliminating glare from motor vehicle head lights, and in other fields.

In order to carry out my invention into practice, I provide a transparent polarizing sheet, the micelles of which are oriented substantially in one direction, said sheet consisting of a colloidal cellulose derivative and containing dyes, the molecules of which are attached to said micelles and give a neutral gray color. According to a further embodiment of my invention, I produce a laminated polarizing body, which comprises at least two superimposed transparent sheets of different colors, which are superimposed in such a way that their polarizing axes are parallel, and the micelles of each of which are oriented substantially in one direction; said sheets consisting of a colloidal cellulose derivative and containing dyes, the molecules of which are attached to said micelles, the colors of said sheets giving, by substraction, a neutral gray color.

Figure 1:
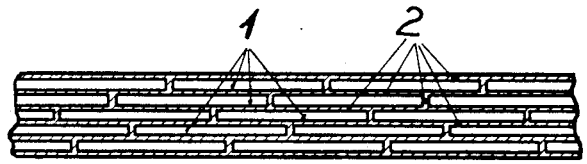
Figure 2:
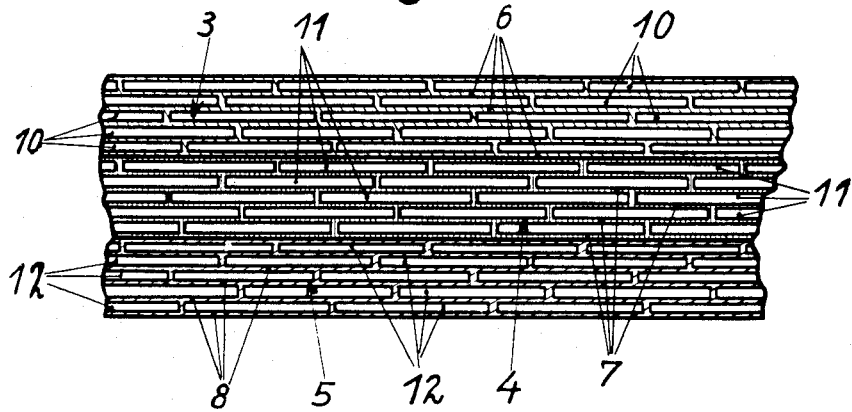

The above mentioned objects and advantages as well as other objects and advantages will be more fully disclosed in the following specification reference being had to the accompanying drawing forming part of this specification, in which:

Fig. 1 is a diagrammatic fragmentary cross-sectional view of a polarizing sheet according to my invention, and Fig. 2 is a diagrammatic fragmentary cross-sectional view of a laminated polarizing body comprising three superimposed sheets of different colors.

It has been found that colored foils, films or sheets of colloidal substances such as cellulose hydrate, or cellulose esters, particularly cellulose acetate, whose molecules or micelles are oriented, have excellent polarizing properties. Foils, films or sheets of hydrated cellulose which is known under the trade names of "Cellophane," "Transparit," "Heliozelle," etc., are particularly suitable for the improved polarizing bodies in accordance with the present invention. Colored foils, films or sheets of other organic colloids exhibiting optical properties similar to those of cellulose hydrate films, i. e. acting as optically uniaxial crystals and being able to rotate the plane of polarized light, can also be used as polarizing bodies. It is to be noted that oriented films or sheets of cellulose hydrate rotate the plane of polarized light by about 90°.

Dyes belonging to the most varied classes can be employed for dyeing the colloid films. As a representative of basic dyes there may be mentioned Methylene Blue, of acid dyes Fast Blue C, and of sulfur dyes Primuline. Preferably there will be used dyes which dye cotton direct. As examples may be named benzidine dyes such as Diamine Blue, Oxamine Green G (Diamine Green G), Sirius Yellow, Diamine Fast Red, etc.

For dyeing the films with substantive dyes for cotton, there are employed the known methods of dyeing cellulose hydrate films. A clear, transparent, colorless film of cellulose hydrate is dyed in the same manner as cotton, for example, with a 1% aqueous solution of Diamine Blue or Oxamine Green G, respectively, while adding 2% of Glauber salt and 2% of soda. The colored films thus obtained are then treated with a 7% solution of glycerin. Sometimes it may be advisable to remove the excess of dye solution from the colored film by squeegees, rollers, rotating in opposite directions, etc.

Colored films of the colloids employed in accordance with the invention exhibit polarizing properties when the individual colloid particles are oriented. This always occurs, to a greater or lesser degree if, during the manufacture of the films, viscose is squirted through orifices on to a support or into the coagulation bath, respectively.

The phenomenon of colored cellulose hydrate films exhibiting polarization is probably due to the fact that the molecules of the dyes employed attach themselves parallel to the molecules or micelles, respectively, of the hydrated cellulose, said molecules or micelles being oriented in one direction. Thus a lattice is formed. Fig. 1 diagrammatically illustrates such a polarizing film according to my invention. 1 indicates the micelles of the colloidal cellulose derivative, and 2 indicates the molecules of the dye attached to said micelles.

Polarizing bodies having particularly good polarizing properties will be obtained when care is taken to effect orientation of the individual cellulose hydrate molecules to the greatest possible degree. Hence, the films or sheets made of the colloidal material employed such as cellulose hydrate, at any stage of the manufacturing or dyeing process are subjected to an additional mechanical stretch in a longitudinal direction, said stretch being effected by drawing, rolling, etc. The additional stretch can be applied during the pouring, the succeeding coagulation, the passage of the films through the dehydration, desulfurization, and bleaching baths, and, finally, during the drying of the films as long as they are still in a wet condition. Obviously, the stretching can also be effected during several or all of these stages of the manufacturing process of the films.

It has been found that colored cellulose hydrate films produced by pouring viscose on to a support, e. g., a glass plate or a drum, when subjected to an additional stretch which in this case may be applied in any direction exhibit much better polarizing properties than do films produced by the pouring process carried out without a support.

Heretofore, cellulose hydrate films have mostly been produced in long lengths. Because of the risk of breakage, such long lengths can be subjected to a certain amount only of additional mechanical stretch. Hence, it is to be preferred to form the films to be used for the improved polarizing bodies according to the invention as an endless band and to subject said band to a stretch. The following procedure, for example, may be adopted:

An endless band was formed by pouring a thin layer of viscose on to a drum which, in an experiment on a laboratory scale, had a diameter of about 200 mm. and a length of about 300 mm., while these dimensions can readily be increased, as desired, when working on a commercial scale. After the pouring, the drum was transferred into an ordinary coagulation bath, said bath acting on the viscose layer and allowing it to be detached from the drum. The slightly solidified endless viscose band was then removed from the drum and placed round two rollers rotating in the same direction. These rollers are made of a material such as glass, hard rubber, or other substances which will not be attacked by the various baths through which the viscose band is subsequently passed. Further, the two rollers are provided with a stretching device which continuously increases their distance. A continuously increasing stretch is thus applied to the endless viscose band placed round the two rollers. The aforementioned pair of rollers carrying the endless viscose band is immersed into another coagulation bath, if desired, in order to render precipitation complete. Then it is passed through the various baths such as desulfurization, water, bleaching, and dye baths which are familiar to those skilled in the art of making cellulose hydrate films. During all these various stages of the process, including the subsequent operations of drying, passing through a glycerin bath, and final drying, a continuous increase of the distance of the two rollers is effected with a view to stretching the endless film band as long as it is still wet and able to be stretched.

The dyeing of the films is preferably carried out directly after the bleaching of the films, the stretching being effected before, during, or after the dyeing operation. Or, colorless films having passed the drying aggregate ordinarily employed in the manufacture of films may be dyed subsequently in that case, the films after being moistened for the dyeing may be subjected to an additional mechanical stretch before, during, or after the dyeing operation, regardless of whether they had been stretched during the manufacturing process or not.

It has been found that particularly effective polarizing bodies will be obtained by stretching or straining the films during the dyeing operation proper (a) at right angles to the direction of the micelles of the colloid substances forming the film, while the dye is being taken up, (b) in the direction of said micelles, after the dye has been taken up, preferably while the film is still wet.

When dyeing films with certain dyes and using these colored films as polarizing bodies, not the whole visible spectrum of light will be polarized. This will result in the color of the film not being extinguished in the analyzer. In order to extinguish the whole visible spectrum by means of the improved polarizing bodies according to the invention, there can be superimposed two or more films of different colors, said colors being complementary so as to give, by subtraction, white or a neutral grey. A film colored brown and another film colored a pure blue, for example, are superimposed, care being taken that the polarizing axes of the individual films are parallel. Fig. 2 illustrates a polarizing body comprising three superimposed films 3, 4 and 5 of different colors. 10, 11 and 12 indicate the micelles of the colloidal cellulose derivatives of the films 3, 4 and 5 respectively. 6 indicates the molecules of the dye attached to the micelles 10, 7 indicates the molecules of the dye attached to the micelles 11, and 8 indicates the molecules of the dye attached to the micelles 12. The dyes 6, 7 and 8 are selected in such a manner, that they produce, by substraction, a neutral gray color.

In lieu of superimposing several films having different colors, there may also be used films colored black, the dyes employed preferably belonging to the class of substantive dyes for cotton such as Diamine Black, Diamine Blue Black, Rayon Black, Direct Grey, etc., and exhibiting a uniform absorption over the whole range of the spectrum. Or, the films can be dyed with several dyes, so as to transmit light of a homogeneous grey. As examples of these dyes may be named Oxamine Green G, Diamine Blue, and Diamine Brown. A mixture of a yellow, a red, and a blue dye can also be used, said mixture having a corresponding absorption spectrum.

It is particularly advantageous to select dyes which do not produce an absolute grey color immediately upon the dyeing of the films, which, however, cause an absolute grey color of the films, when the latter are stretched after the dyeing operation. For example prior to the stretching, colors of certain spectral ranges such as violet, green, or the like, are still visible. The films are dyed in the usual manner, for example, in a dye bath containing 3 parts of Rayon Black and 1 part of Direct Grey. The film so dyed still transmits light of a green color, said color disappearing after the stretching. When the additional stretching, however, is effected prior to the dyeing operation, the dyes, as regards their nature and their quantity, are selected so as to be taken up at once as a neutral grey. There are employed, for example, equal parts by weight of Direct Grey and Rayon Black. The nature and quantity of the respective dyes vary, depending on whether or no the films to be dyed have been poured on to a support.

The quantity of the dyes employed is adjusted according to the amount of residual light allowed with crossed polarizing bodies formed by using the new films. It is known that of the light passing through the face of a polarizing body and vibrating in two directions, only part of the light vibrating in one direction is absorbed by the polarizing body. This results in preventing a complete extinction of the light when using two crossed polarizing bodies. The greater the amount of residual light to be allowed, the smaller the quantity of coloring matter employed for dyeing the films. With films intended for eliminating glare from automobile head lights, a greater amount of residual light may generally be allowed than with films to be used in the manufacture of polarizing spectacles for viewing stereoscopic motion pictures.

The quantities of dyes to be employed also vary according to the degree of additional stretch which will be applied to the films. Films which have undergone more stretch, for obtaining the same degree of polarization will require less coloring matter than do films subjected to less stretch. The optimum of the polarizing effect will be obtained by dyeing the films with as little coloring matter as possible and subjecting them to a maximum of stretch, or when the transparency of the films, after the dyeing and stretching operations, amounts to 50% or somewhat less.

Inasmuch as thinner films, without any risk of breakage may be stretched to a greater extent than thicker ones, it is preferable to use for the improved polarizing bodies according to the invention films of a thickness of less than .02 mm. Films having a thickness of .005 mm. have proved particularly advantageous. In order to obtain films having a particularly high tensile strength, it is advisable to employ as parent material viscose which has been matured as far as possible.

In order to prevent colored films, unless they are dyed with fast dyes, from fading, they are preferably protected by covering them with or enclosing them between glass plates, said glass plates consisting of glass of a high absorption capacity for rays of short wave length.

The improved films according to the invention are eminently suitable for the manufacture of spectacles for viewing stereoscopic motion pictures. With such spectacles, the polarizing axis of the one lens is rotated by 90° relative to the axis of the other lens. The improved polarizing bodies may also serve in the manufacture of the polarizing device used for projecting stereoscopic films. Similarly, the improved polarizing bodies according to the invention may be employed in devices for eliminating the glare from automobile head lights, said bodies being fitted, on the one hand, to the head lights and, on the other hand, on the windshield or visor.

From known polarizing bodies comprising herapathite crystals which are embedded in viscous, solidifying carrier colloids and being oriented, the improved polarizing bodies according to the present invention differ inasmuch as the dyes are attached to colloids exhibiting a lattice structure. As compared with known polarizing bodies, the polarizing bodies according to the present invention show considerable advantages. Of the light passing through the face of known polarizing bodies and vibrating in two directions, only part of the light vibrating in one direction is absorbed by the polarizing body. This results in preventing a complete extinction of the light when using two crossed polarizing bodies. With the known films containing herapathite this residual light amounts to about 15%, while the fact of the residual light being colored constitutes an additional drawback. With the improved polarizing bodies according to the invention, there remains only a residual light of 3% or less. An additional advantage resides in the fact that, particularly with polarizing bodies colored a homogeneous black or grey, said residual light extends over the whole range of the spectrum no specific color being given preference. The range of application of the improved polarizing bodies according to the present invention is thus considerably widened.

As many apparent and widely different embodiments of this invention may be made without departing from the spirit and scope thereof, it is to be understood that the invention is not to be limited except as defined in the appended claims.

What I claim is:

1. A transparent polarizing sheet, the micelles of which are oriented substantially in one direction, said sheet consisting of colloidal cellulose hydrate, and containing complementary dyes, the molecules of which are attached to said micelles, and give a neutral gray color.

2. A laminated polarizing body, which comprises at least two superimposed transparent polarizing sheets of different complementary colors, which are superimposed in such a way that their polarizing axes are parallel, and the micelles of each of which are oriented substantially in one direction; said sheets consisting of a colloidal cellulose derivative and containing dyes producing said colors, the molecules of said dyes being attached to said micelles, the colors of said sheets giving, by substraction, a neutral gray color.

3. A laminated polarizing body, which comprises at least two superimposed transparent polarizing sheets of different complementary colors, which are superimposed in such a way that their polarizing axes are parallel, and the micelles of each of which are oriented substantially in one direction; said sheets consisting of colloidal cellulose hydrate and containing dyes producing said colors, the molecules of said dyes being attached to said micelles, the colors of said sheets giving, by substraction, a neutral gray color.

4. A transparent polarizing sheet, the micelles of which are oriented substantially in one direction, said sheet consisting of a stretched, endless band of colloidal cellulose hydrate, and containing complementary dyes, the molecules of which are attached to said micelles, and give a neutral gray color.

ERWIN KÄSEMANN.